Sept. 13, 1932. J. WOLFFERTS 1,876,817
WASTE AND OVERFLOW FOR LAVATORIES, BIDETS, BATHTUBS, OR THE LIKE
Filed May 6, 1931
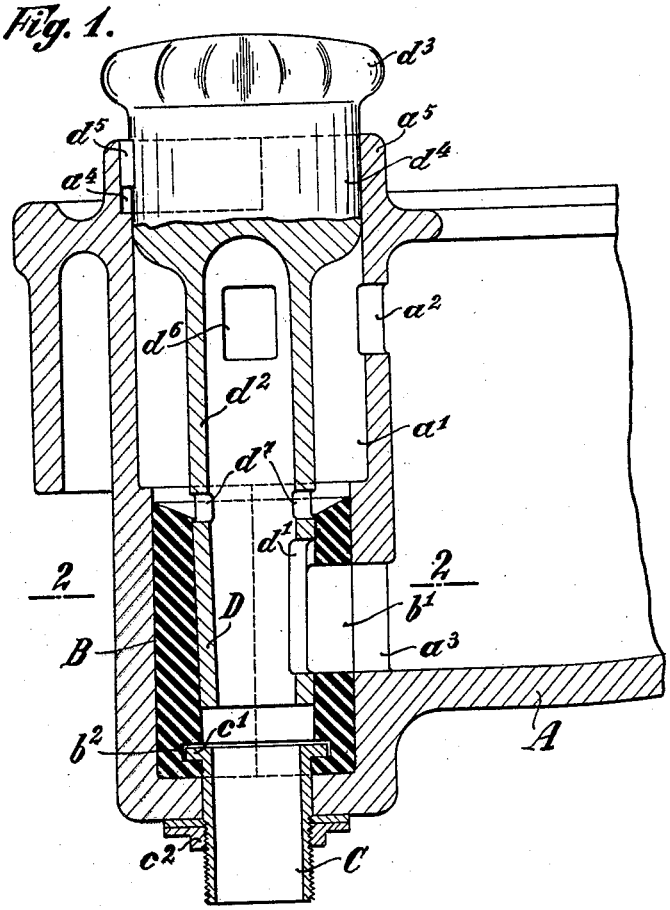
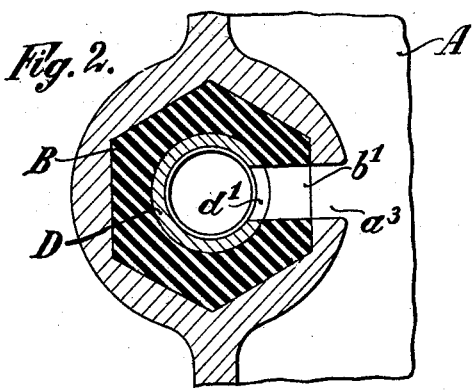

Patented Sept. 13, 1932

1,876,817

UNITED STATES PATENT OFFICE

JEAN WOLFFERTS, OF DUSSELDORF, GERMANY

WASTE AND OVERFLOW FOR LAVATORIES, BIDETS, BATHTUBS, OR THE LIKE

Application filed May 6, 1931, Serial No. 535,384, and in Germany May 14, 1930.

The invention relates to waste and overflow devices for lavatories, bidets, bath tubs, and the like, and particularly to that class in which a gate valve is provided for the waste in a common discharge duct for waste and overflow, the casing of the valve being inserted in the discharge duct so as to be removable as a separate unit, and has for its object to provide devices of this type which are of simplest possible design and, on the other hand, comply fully with all sanitary requirements. According to the invention, this object is attained chiefly by employing a rubber casing for the valve which is made from a non-corrodible material indifferent to rubber, such as porcelain, glass or the like.

By way of example, one form of the invention is illustrated in the accompanying drawing, in which Figure 1 is a vertical section of the parts concerned of a lavatory constructed according to the invention with opened waste; and Fig. 2, a cross section on the line 2—2, of Fig. 1.

Referring to the drawing, the bowl A is provided in a thickened portion of its rear wall with a discharge duct $a^1$ passing from top to bottom, and the overflow outlet $a^2$ and the waste outlet $a^3$ open, respectively, into the upper and lower part of the discharge duct $a^1$. In the lower part of the discharge duct $a^1$ a rubber slide valve casing B is inserted having inside the form of a hollow cone and being provided with an orifice $b^1$ in register with the waste outlet $a^3$.

The valve casing is outwardly dimensioned so that it may closely and elastically hub the walls of the discharge duct; to prevent its displacement within the discharge duct, it may, for example, outwardly have the form of a hexagonal prism while that portion of the discharge duct surrounding the casing has the same cross sectional shape. Moreover, to facilitate the insertion and removal of the casing, the latter as well as the discharge duct may be slightly reduced downwardly. The lower part of the casing B possesses near its end an internal groove $b^2$ engaged by the flange $c^1$ of a metal pipe connection C for the usual siphon of the discharge duct, the connection C making it further possible to press the casing B against the annular bottom surface in the duct $a^1$ by means of a screwed-on nut $c^2$. The hollow slide valve D for sealing the waste opening has a flow opening $d^1$ and is made of glazed china, glass or the like. In its lower portion it is slightly conical to correspond to the inner form of the casing B and extends upwardly into a cylindrical pipe $d^2$ terminating in a solid head $d^4$ provided with the handling edge $d^3$. This head $d^4$, which fills up and shuts off the discharge duct $a^1$ on top, carries a lateral nose $d^5$ engaging a ring-sector-like recess $a^4$ of a basin roll $a^5$ surrounding the upper duct opening, and serving to limit the motion of the slide valve. The wall of the slide valve pipe $d^2$ contains the apertures $d^6$ and $d^7$ through which water coming out of the overflow orifice $a^2$ may flow away.

The waste and overflow arrangements described whose assembly and mode of action require no detailed description are of very simple construction, since, besides the usual pipe connections, they need only two structural elements, viz, the slide valve tube and the slide valve casing. These two elements are made of china, glass or rubber, which are quite cheap materials, and their final shaping, unlike metal slide valves and casings, requires no mechanical finishing. Furthermore, special packing for the slide valve casing in the discharge duct can be dispensed with so that the entire device can be produced at very low cost. Another feature of the invention is that, owing to the inherent elasticity of the rubber slide valve casing, harmful stresses between the latter and the walls of the duct are prevented and the danger of damages due, for instance, to unequal expansion under the influence of heat in metal slide valve casings cemented into the duct is simply and effectively eliminated. Finally, the device described meets the highest sanitary requirements, as its discharge duct can be conveniently and thorough cleaned after the removal of the slide valve casing and oxidizable metal parts with which the bowl contents could come into contact are not employed at all.

I claim:—

1. In a device of the type described a bowl casing, a discharge duct therein, a slide valve casing consisting of rubber and removably inserted in the said discharge duct, an inner groove in the lower part of the valve casing, and a connecting member for the discharge piping of the bowl casing made of metal and having an annular flange engaging the said groove and adapted to secure the slide valve casing to the bowl casing.

2. In a device of the type described a bowl, a vertical discharge duct, a bowl wall separating the said discharge duct from the said bowl, an overflow opening and a waste opening in the said bowl wall, a valve casing of thick-walled rubber removably inserted in the said discharge duct and provided with a flow opening disposed flush with the said waste opening, and a conical hollow rotary valve of porcelain rotatably arranged in the said valve casing and provided above the said casing with an opening for the overflow and within range of the said casing with an opening for the waste cooperating with the waste opening of the bowl.

3. In a device of the type described a bowl, a vertical discharge duct, a bowl wall separating the said discharge duct from the said bowl, an overflow opening and a waste opening in the said bowl wall, a valve casing of thick-walled rubber removably inserted in the said discharge duct and provided with a flow opening disposed flush with the said waste opening, and a conical hollow rotary valve of porcelain rotatably arranged in the said valve casing and provided above the said casing with an opening for the overflow and within range of the said casing with an opening for the waste cooperating with the waste opening of the bowl, the said valve casing having outwardly a non-circular cross section, the said discharge duct having a corresponding cross section adapted to hold the said valve casing in position.

The foregoing specification signed at Koln, Germany, this 23d day of April, 1931.

JEAN WOLFFERTS.